US012783884B2

(12) United States Patent
Hattori et al.

(10) Patent No.: US 12,783,884 B2
(45) Date of Patent: Nov. 3, 2026

(54) NEURAL NETWORK LEARNING APPARATUS, NEURAL NETWORK LEARNING METHOD, AND PROGRAM

(71) Applicant: NTT, Inc.

(72) Inventors: Takashi Hattori, Tokyo (JP); Hiroshi Sawada, Tokyo (JP); Tomoharu Iwata, Tokyo (JP)

(73) Assignee: NTT, Inc., Tokyo (JP)

( * ) Notice: Subject to any disclaimer, the term of this patent is extended or adjusted under 35 U.S.C. 154(b) by 518 days.

(21) Appl. No.: 18/558,983

(22) PCT Filed: May 17, 2021

(86) PCT No.: PCT/JP2021/018589

§ 371 (c)(1),
(2) Date: Nov. 3, 2023

(87) PCT Pub. No.: WO2022/244050

PCT Pub. Date: Nov. 24, 2022

(65) Prior Publication Data

US 2024/0232624 A1 Jul. 11, 2024

(51) Int. Cl.
*G06N 3/08* (2023.01)

(52) U.S. Cl.
CPC .................................... *G06N 3/08* (2013.01)

(58) Field of Classification Search
CPC .................... G06N 3/0455; G06N 3/09; G06F 18/2133; G06V 10/77
See application file for complete search history.

(56) References Cited

PUBLICATIONS

J. Chorowski and J. M. Zurada, "Learning Understandable Neural Networks With Nonnegative Weight Constraints," in IEEE Transactions on Neural Networks and Learning Systems, vol. 26, No. 1, pp. 62-69, Jan. 2015 (Year: 2015).*

H. Daniels and M. Velikova, "Monotone and Partially Monotone Neural Networks, " in IEEE Transactions on Neural Networks, vol. 21, No. 6, pp. 906-917, Jun. 2010. (Year: 2010).*

E. Hosseini-Asl, J. M. Zurada and O. Nasraoui, "Deep Learning of Part-Based Representation of Data Using Sparse Autoencoders With Nonnegativity Constraints," in IEEE Transactions on Neural Networks and Learning Systems, vol. 27, No. 12, pp. 2486-2498, Dec. 2016. (Year: 2016).*

(Continued)

*Primary Examiner* — Vincent Gonzales
*Assistant Examiner* — Pedro J Morales

(57) ABSTRACT

Provided is a technique for performing learning of a neural network including an encoder and a decoder such that a certain latent variable included in a latent variable vector is larger or the certain latent variable included in the latent variable vector is smaller as a magnitude of a certain property included in an input vector is larger. A neural network learning device performs learning of a neural network including an encoder that converts an input vector into a latent variable vector and a decoder that converts the latent variable vector into an output vector such that the input vector and the output vector are substantially equal to each other, and the learning is performed to cause the latent variable to have monotonicity with respect to the input vector.

14 Claims, 4 Drawing Sheets

(56) References Cited

PUBLICATIONS

Hattori et al. (2020) "Feature Extraction of Students and Problems via Exam Result Analysis using Variational Autoencoder" The 34th Annual Conference of the Japanese Society for Artificial Intelligence, Jun. 9, 2020, with its English translation generated by computer.
Hosseini-Asl et al. (2015) "Deep Learning of Part-Based Representation of Data Using Sparse Autoencoders With Nonnegativity Constraint" IEEE Transaction Neural Networks and Learning Systems, vol. 27, No. 12, pp. 2486-2498, Oct. 28, 2015.
Hattori et al. (2020) "Feature Extraction of Students and Problems via Exam Result Analysis using Variational Autoencoder" Jun. 11, 2020, with its English translation generated by computer.
Lee et al. (1999) "Learning the Parts of Objects by Nonnegative Matrix Factorization," Nature, 401, pp. 788-791.
Kemp (2006) "Learning systems of concepts with an infinite relational model," AAAI06 (Proceedings of the 21st national conference on Artificial intelligence, pp. 381-388.

* cited by examiner

NEURAL NETWORK LEARNING APPARATUS, NEURAL NETWORK LEARNING METHOD, AND PROGRAM

CROSS-REFERENCE TO RELATED APPLICATIONS

This application is a U.S. 371 Application of International Patent Application No. PCT/JP2021/018589, filed on 17 May 2021, the disclosure of which is hereby incorporated herein by reference in its entirety.

TECHNICAL FIELD

The present invention relates to a technique for performing learning of a neural network.

BACKGROUND ART

Various methods have been devised as a method for analyzing a large amount of high-dimensional data. For example, there are methods using non-negative matrix factorization (NMF) of Non Patent Literature 1 and infinite relational model (IRM) of Non Patent Literature 2. By using these methods, it is possible to find characteristic properties of data or to group data having common properties as a cluster.

CITATION LIST

Non Patent Literature

Non Patent Literature 1: Lee, D. D. and Seung, H. S., "Learning the parts of objects by non-negative matrix factorization," Nature, 401, pp. 788-791, 1999.

Non Patent Literature 2: Kemp, C., Tenenbaum, J. B., Griffiths, T. L., Yamada, T. and Ueda, N., "Learning systems of concepts with an infinite relational model," AAAI06 (Proceedings of the 21st national conference on Artificial intelligence, pp. 381-388, 2006.

SUMMARY OF INVENTION

Technical Problem

Analysis methods using NMF or IRM often require advanced analysis techniques such as those possessed by data analysts. However, since the data analysts are often unfamiliar with high-dimensional data (hereinafter, referred to as data to be analyzed) itself to be analyzed, in such a case, collaborative work with experts of the data to be analyzed is required, but this work may not proceed well. Thus, there is a need for a method that can be analyzed only by the experts of data to be analyzed without requiring the data analysts.

Analysis is considered that uses a neural network including an encoder and a decoder like the variational autoencoder (VAE) of Reference Non Patent Literature 1. Here, the encoder is a neural network that converts an input vector into a latent variable vector, and the decoder is a neural network that converts the latent variable vector into an output vector. In addition, the latent variable vector is a lower-dimensional vector than the input vector and the output vector, and is a vector having a latent variable as an element. When high-dimensional data to be analyzed is converted by using the encoder for which learning is performed such that the input vector and the output vector are substantially identical to each other, the data to be analyzed can be compressed into low-dimensional secondary data; however, since a relationship between the data to be analyzed and the secondary data is unknown, the data cannot be applied to analysis work as it is. Here, the fact that the learning is performed such that the input vector and the output vector are substantially identical to each other means that, ideally, the learning is preferably performed such that the input vector and the output vector are completely identical to each other, but in practice, the learning has to be performed such that the input vector and the output vector are substantially identical to each other due to a constraint of a learning time or the like, and thus the learning is performed in such a manner that processing is terminated assuming that the input vector and the output vector are identical to each other when a predetermined condition is satisfied.

(Reference Non Patent Literature 1: Kingma, D. P. and Welling, M., "Auto-encoding variational bayes," arXiv preprint arXiv: 1312.6114, 2013.)

Thus, an object of the present invention is to provide a technique for performing learning of a neural network including an encoder and a decoder such that a certain latent variable included in a latent variable vector is larger or the certain latent variable included in the latent variable vector is smaller as the magnitude of a certain property included in an input vector is larger.

Solution to Problem

One aspect of the present invention is a neural network learning device that performs learning of a neural network including an encoder that converts an input vector into a latent variable vector having a latent variable as an element and a decoder that converts the latent variable vector into an output vector such that the input vector and the output vector are substantially identical to each other, in which the learning is performed such that, in a case where two input vectors are set as a first input vector and a second input vector, and a value of an element of the first input vector is greater than a value of an element of the second input vector for at least one element of the input vector, and a value of an element of the first input vector is greater than or equal to a value of an element of the second input vector for all remaining elements of the input vector, a latent variable vector obtained by converting the first input vector is set as a first latent variable vector, a latent variable vector obtained by converting the second input vector is set as a second latent variable vector, a value of an element of the first latent variable vector is greater than a value of an element of the second latent variable vector for at least one element of the latent variable vector, and a value of an element of the first latent variable vector is greater than or equal to a value of an element of the second latent variable vector for all remaining elements of the latent variable vector.

One aspect of the present invention is a neural network learning device that performs learning of a neural network including an encoder that converts an input vector into a latent variable vector having a latent variable as an element and a decoder that converts the latent variable vector into an output vector such that the input vector and the output vector are substantially identical to each other, in which the learning is performed such that, in a case where two input vectors are set as a first input vector and a second input vector, and a value of an element of the first input vector is greater than a value of an element of the second input vector for at least one element of the input vector, and a value of an element of the first input vector is greater than or equal to a value of an element of the second input vector for all remaining elements of the input vector, a latent variable vector obtained by converting the first input vector is set as a first latent variable vector, a latent variable vector obtained by converting the second input vector is set as a second latent variable vector, a value of an element of the first latent variable vector is less than a value of an element of the second latent variable vector for at least one element of the latent variable vector, and a value of an element of the first latent variable vector is less than or equal to a value of an element of the second latent variable vector for all remaining elements of the latent variable vector.

Advantageous Effects of Invention

According to the present invention, it is possible to perform learning of a neural network including an encoder and a decoder such that a certain latent variable included in a latent variable vector is larger or the certain latent variable included in the latent variable vector is smaller as the magnitude of a certain property included in an input vector is larger.

DESCRIPTION OF EMBODIMENTS

Figure 1:
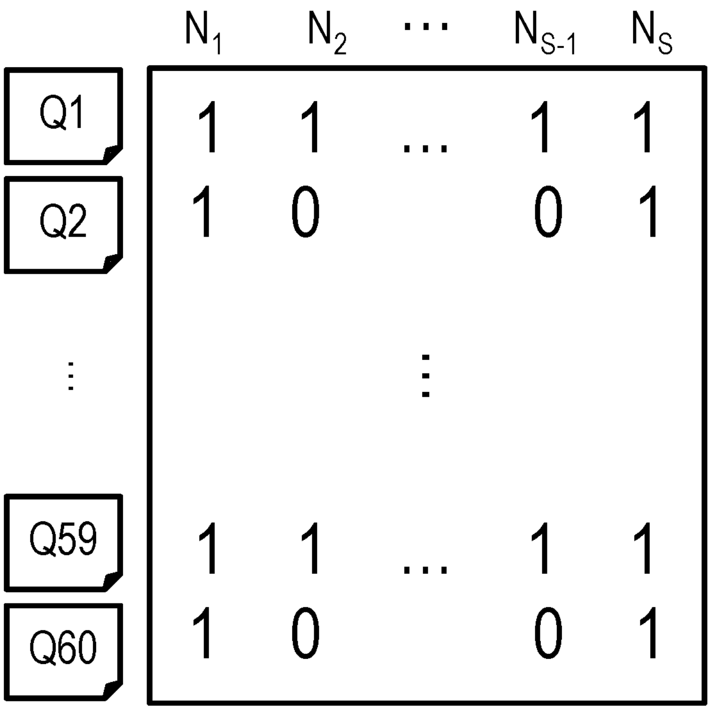
FIG. 1 is a diagram illustrating an example of data to be analyzed.

Hereinafter, embodiments of the present invention will be described in detail. Note that components having the same functions are denoted by the same reference numerals, and redundant description will be omitted.

Prior to the description of each embodiment, a notation method in this description will be described.

A symbol ^ (caret) represents a superscript. For example, $x^{y\hat{}z}$=represents that $y^z$ is a superscript for x, and $x_{y\hat{}z}$ represents that $y^z$ is a subscript for x. In addition, a symbol _ (underscore) represents a subscript. For example, $x^{y\_z}$ represents that $y_z$ is a superscript for x, and $x_{y\_z}$ represents that $y_z$ is a subscript for x.

In addition, a superscript "^" or "~" such as ^x or ~x for a certain character x should be normally written directly above the "x", but is written as ^x or ~x due to a constraint of notation in the description.

TECHNICAL BACKGROUND

Here, a description will be given of a learning method of a neural network including an encoder and a decoder used in the embodiments of the present invention. The neural network used in the embodiments of the present invention is a neural network including the encoder that converts an input vector into a latent variable vector and the decoder that converts the latent variable vector into an output vector. In the embodiments of the present invention, in the neural network, learning is performed such that the input vector and the output vector are substantially identical to each other. In the embodiments of the present invention, to cause a certain latent variable included in the latent variable vector to be larger or the certain latent variable included in the latent variable vector to be smaller as the magnitude of a certain property included in the input vector is larger, the learning is performed assuming that the latent variable has a feature below (hereinafter, referred to as Feature 1).

[Feature 1] Learning is Performed Such that a Latent Variable has Monotonicity with Respect to an Input Vector.

Here, the fact that the latent variable has monotonicity with respect to the input vector means that there is a relationship of either a monotonic increase in which the latent variable vector increases as the input vector increases or a monotonic decrease in which the latent variable vector decreases as the input vector increases. Note that the magnitude of the input vector or the latent variable vector is based on an order relationship related to the vector (that is, a relationship defined by using an order relationship related to each element of the vector), and for example, the following order relationship can be used.

For vectors $v=(v_{1i}, \ldots, v_n)$ and $v'=(v'_1, \ldots, v'_n)$, the fact that $v \leq v'$ holds means that $v_i \leq v'_i$ holds for all elements of the vectors v and v', that is, for the i-th element $v_i$ of the vector v and the i-th element $v'_i$ of the vector v' (where $i=1, \ldots, n$).

The fact that the learning is performed such that the latent variable has monotonicity with respect to the input vector specifically means that the learning is performed such that the latent variable vector has either of a first relationship or a second relationship below with the input vector.

The first relationship is a relationship in which, in a case where two input vectors are set as a first input vector and a second input vector, and a value of an element of the first input vector is greater than a value of an element of the second input vector for at least one element of the input vector, and a value of an element of the first input vector is greater than or equal to a value of an element of the second input vector for all remaining elements of the input vector, a latent variable vector obtained by converting the first input vector is set as a first latent variable vector, a latent variable vector obtained by converting the second input vector is set as a second latent variable vector, a value of an element of the first latent variable vector is greater than a value of an element of the second latent variable vector for at least one element of the latent variable vector, and a value of an element of the first latent variable vector is greater than or equal to a value of an element of the second latent variable vector for all remaining elements of the latent variable vector.

The second relationship is a relationship in which, in a case where two input vectors are set as a first input vector and a second input vector, and a value of an element of the first input vector is greater than a value of an element of the second input vector for at least one element of the input vector, and a value of an element of the first input vector is greater than or equal to a value of an element of the second input vector for all remaining elements of the input vector, a latent variable vector obtained by converting the first input vector is set as a first latent variable vector, a latent variable vector obtained by converting the second input vector is set as a second latent variable vector, a value of an element of the first latent variable vector is less than a value of an element of the second latent variable vector for at least one element of the latent variable vector, and a value of an element of the first latent variable vector is less than or equal to a value of an element of the second latent variable vector for all remaining elements of the latent variable vector.

Note that, for convenience, an expression indicating that the latent variable is in a monotonic increase relationship with the input vector may be used in a case where the first relationship is represented, and an expression indicating that the latent variable is in a monotonic decrease relationship with the input vector may be used in a case where the second relationship is represented. Thus, an expression indicating that the latent variable has monotonicity with respect to the input vector can also be said to be an expression for convenience indicating that the latent variable has either the first relationship or the second relationship.

In the embodiments of the present invention, to perform learning such that the input vector and the output vector are substantially identical to each other, the learning may be performed by using a relationship between the latent variable vector and the output vector instead of performing learning by using a relationship between the input vector and the latent variable vector. Specifically, the learning may be performed such that the output vector has either of a third relationship or fourth relationship below with the latent variable vector. Note that the following third relationship is equivalent to the above-described first relationship, and the following fourth relationship is equivalent to the above-described second relationship.

The third relationship is a relationship in which, in a case where two latent variable vectors are set as a first latent variable vector and a second latent variable vector, and a value of an element of the first latent variable vector is greater than a value of an element of the second latent variable vector for at least one element of the latent variable vector, and a value of an element of the first latent variable vector is greater than or equal to a value of an element of the second latent variable vector for all remaining elements of the latent variable vector, an output vector obtained by converting the first latent variable vector is set as a first output vector, a output vector obtained by converting the second latent variable vector is set as a second output vector, a value of an element of the first output vector is greater than a value of an element of the second output vector for at least one element of the output vector, and a value of an element of the first output vector is greater than or equal to a value of an element of the second output vector for all remaining elements of the output vector.

The fourth relationship is a relationship in which, in a case where two latent variable vectors are set as a first latent variable vector and a second latent variable vector, and a value of an element of the first latent variable vector is greater than a value of an element of the second latent variable vector for at least one element of the latent variable vector, and a value of an element of the first latent variable vector is greater than or equal to a value of an element of the second latent variable vector for all remaining elements of the latent variable vector, an output vector obtained by converting the first latent variable vector is set as a first output vector, an output vector obtained by converting the second latent variable vector is set as a second output vector, a value of an element of the first output vector is less than a value of an element of the second output vector for at least one element of the output vector, and a value of an element of the first output vector is less than or equal to a value of an element of the second output vector for all remaining elements of the output vector.

Note that, for convenience, an expression indicating that the output vector is in a monotonic increase relationship with the latent variable may be used in a case where the third relationship is represented, and an expression indicating that the output vector is in a monotonic decrease relationship with the latent variable may be used in a case where the fourth relationship is represented. Further, for convenience, an expression indicating that the output vector has monotonicity with respect to the latent variable may be used to indicate that the output vector has either the third relationship or the fourth relationship.

The learning is performed such that the latent variable has Feature 1 as described above, whereby a latent variable is provided that satisfies a condition that a certain latent variable included in the latent variable vector is larger or the certain latent variable included in the latent variable vector is smaller as the magnitude of a certain property included in the input vector is larger.

Note that, in the embodiments of the present invention, the learning may be performed assuming that the latent variable has a feature below (hereinafter, referred to as Feature 2) in addition to Feature 1 described above.

[Feature 2] Learning is Performed Such that a Possible Value of a Latent Variable is a Value in a Predetermined Range.

The learning is performed such that the latent variable also has Feature 2 described above in addition to the Feature 1 described above, whereby the latent variable is provided that satisfies the condition that the certain latent variable included in the latent variable vector is larger or the certain latent variable included in the latent variable vector is smaller as the magnitude of the certain property included in the input vector is larger, as a parameter that is easily understood by a general user.

A description will be given of a constraint for performing learning of a neural network including an encoder that outputs a latent variable having a feature of Feature 1 described above. Specifically, two constraints below will be described.

[Constraint 1] Learning is performed such that a loss function including a loss term for monotonicity violation is minimized.

[Constraint 2] Learning is performed by constraining all weight parameters of the decoder to be non-negative values or constraining all weight parameters of the decoder to be non-positive values.

First, the neural network as a learning target will be described. For example, a VAE as described below can be used. The encoder and the decoder are two-layer neural networks, and the first layer and the second layer of the encoder are fully connected, and the first layer and the second layer of the decoder are fully connected. The input vector that is an input of the first layer of the encoder is, for example, a 60-dimensional vector. The output vector that is an output of the second layer of the decoder is a vector obtained by restoring the input vector. In addition, a sigmoid function is used as an activation function of the second layer of the encoder. As a result, the value of the element of the latent variable vector that is an output of the encoder (that is, each latent variable) is greater than or equal to 0 and less than or equal to 1. Note that the latent variable vector is a lower-dimensional vector than the input vector, for example, a five-dimensional vector. As a learning method, for example, Adam (see Reference Non Patent Literature 2) can be used.

(Reference Non Patent Literature 2: Kingma, D. P. and Jimmy B., "Adam: A Method for Stochastic Optimization," arXiv: 1412.6980, 2014)

Note that a range of a possible value of the latent variable can be set to [m, M] (where $m<M$) instead of [0, 1], and in this case, for example, a next function s(x) can be used as the activation function instead of the sigmoid function.

$$s(x) = m + \frac{M - m}{1 + e^{-x}} \quad \text{[Math. 1]}$$

Next, a loss function including the loss term of Constraint 1 will be described. A loss function L is defined as a function including a term $L_{mono}$ for causing the latent variable to have monotonicity with respect to the input vector. For example, the loss function L can be a function defined by the following formula. Note that the term $L_{mono}$ in the following formula is a formula including a term related to Feature 2 in addition to a term related to Feature 1 to perform efficient description, and the term related to Feature 2 will be appropriately described.

$$L = L_{RC} + L_{prior} + L_{mono} \quad \text{[Math. 2]}$$

$$L_{mono} = L_{real} + \sum_{p=1}^{2} L_{syn-encoder}^{(p)} + \sum_{p=1}^{2} L_{syn-decoder}^{(p)} \quad \text{[Math. 3]}$$

Terms $L_{RC}$ and $L_{prior}$ respectively are a term related to a reconstruction error used in general VAE learning and a term related to a Kullback-Leibler divergence. For example, the term $L_{RC}$ is binary cross entropy (BCE) of an error between the input vector and the output vector, and the term $L_{prior}$ is a Kullback-Leibler divergence between a distribution of the latent variable that is the output of the encoder and a prior distribution. FIG. 1 is a matrix representing correctness/incorrectness of answers to test problems of students with a correct answer set to 1 and an incorrect answer set to 0, in which a row represents a list of correctness/incorrectness of all the students for each problem, and a column represents a list of correctness/incorrectness of all the problems of each student. Here, in FIG. 1, Q1, . . . , and Q60 represent the first problem, . . . , and the 60th problem, and $N_1$, . . . , and $N_S$ represent the first student, . . . , and the S-th student, respectively. Thus, in this case, each column is an input vector that is an input to the encoder, and S is the number of pieces of training data. Since each element of the input vector has a value of 1 or 0, for example, a Gaussian distribution with an average $\mu=0.5$ and a variance $\sigma^2=1$ can be used as the prior distribution for the example of FIG. 1.

The term $L_{mono}$ is a sum of three kinds of terms $L_{real}$, $L_{syn-endcoder}^{(p)}$, and $L_{syn-decoder}^{(p)}$. The term $L_{real}$ is a term for establishing monotonicity between the latent variable and the output vector, that is, a term related to Feature 1. That is, the term $L_{real}$ is a term for establishing a monotonic increase relationship between the latent variable and the output vector, or a term for establishing a monotonic decrease relationship between the latent variable and the output vector. On the other hand, the term $L_{syn-endcoder}^{(p)}$, and $L_{syn-decoder}^{(p)}$ are terms related to Feature 2.

Hereinafter, an example of the term $L_{real}$ for establishing a monotonic increase relationship between the latent variable and the output vector will be described together with the learning method. First, actual data (in the example of FIG. 1, a list of correctness/incorrectness of each student) is input as an input vector, and a latent variable vector (hereinafter, referred to as an original latent variable vector) is obtained as an output of the encoder. Next, a vector is obtained in which a value of at least one element of the original latent variable vector is replaced with a value smaller than the value of the element. Hereinafter, the vector obtained here is referred to as an artificial latent variable vector. Note that, in a case where a lower limit of a range of possible values for elements is limited, it is only required to obtain, as the artificial latent variable vector, a vector in which a value of at least one element of the original latent variable vector is replaced with a value that is greater than or equal to the lower limit of the range and less than the value of the element. In the present description, words with “artificial” such as “artificial latent variable vector” are used, but the words are words for describing that the artificial latent variable vector is not an original latent variable, and are not words intended to be obtained by manual work.

Here, an example of processing of obtaining an artificial latent variable vector will be described. For example, the artificial latent variable vector is generated by decreasing a value of one element of the original latent variable vector within a range of a possible value for the element. In the artificial latent variable vector thus obtained, a value of any one element is smaller than that of the original latent variable vector, and values of the other elements are the same. Note that a plurality of artificial latent variable vectors may be generated by decreasing values of different elements of the latent variable vector within a range of possible values for the elements. That is, in a case where the latent variable vector is a five-dimensional vector, five artificial latent variable vectors are generated from one original latent variable vector. In addition, the artificial latent variable vector may be generated by decreasing values of a plurality of elements of the latent variable vector within a range of possible values for respective elements. That is, the artificial latent variable vector may be generated in which the values of the plurality of elements are smaller than those of the original latent variable vector and the values of the remaining elements are the same. In addition, for a plurality of sets of a plurality of elements of the latent variable vector, a value of each element included in each set is decreased within a range of a possible value for each element, whereby a plurality of artificial latent variable vectors may be generated.

Note that, as a method of obtaining, from a value of an element of the original latent variable vector, a value, which is a smaller value than the value of the element, of an element of the artificial latent variable vector, if the lower limit of the range of the possible values for the elements is 0, it is only required to use, for example, a method of obtaining the value of the element of the artificial latent variable vector by multiplying the value of the element of the original latent variable vector by a random number in a section (0, 1) to reduce the value, or a method of obtaining the value of the element of the artificial latent variable vector by multiplying the value of the element of the original latent variable vector by ½ to halve the value.

In a case where an artificial latent variable vector is used in which a value of an element of the original latent variable vector is replaced with a value smaller than the value of the element, a value of each element of an output vector when the original latent variable vector is input is desirably larger than a value of a corresponding element of an output vector when the artificial latent variable vector is input. Thus, the term $L_{real}$ can be, for example, a term that is a large value in a case where a value of a corresponding element of the output vector when the original latent variable vector is input is smaller than a value of each element of the output vector when the artificial latent variable vector is input, margin ranking error. Here, a margin ranking error $L_{MRE}$ is defined by the following formula, where Y is the output vector when the original latent variable vector is input, and Y' is the output vector when the artificial latent variable vector is input.

$$L_{MRE} = \sum_i \max\{0, -(Y_i - Y'_i)\}$$ [Math. 4]

(where $Y_i$ represents the i-th element of Y, and $Y'_i$. represents the i-th element of Y'.)

The learning is performed by using the artificial latent variable vector generated as described above and the term $L_{real}$ defined as the margin ranking error.

Note that, instead of using a vector in which a value of at least one element of the original latent variable vector is replaced with a value smaller than the value of the element as the artificial latent variable vector, a vector in which a value of at least one element of the original latent variable vector is replaced with a value larger than the value of the element may be used as the artificial latent variable vector. In this case, the value of each element of the output vector when the original latent variable is input is desirably smaller than the value of the corresponding element of the output vector when the artificial latent variable is input. Thus, the term $L_{real}$ is only required to be a term having a large value in a case where the value of each element of the output vector when the original latent variable vector is input is larger than the value of the corresponding element of the output vector when the artificial latent variable vector is input.

Note that, as a method of obtaining, from a value of an element of the original latent variable vector, a value, which is a larger value than the value of the element, of an element of the artificial latent variable vector, if an upper limit of the range of the possible values for the elements is limited, the value, which is the larger value than the value of the element, of the element of the artificial latent variable vector is obtained from the value of the element of the original latent variable vector within the upper limit of the range, and thus, it is only required to use, for example, a method of obtaining a value randomly selected from between the value of the element of the original latent variable vector and the upper limit of the range of the possible value for the element as the value of the element of the artificial latent variable vector, or a method of obtaining an average value of the value of the element of the original latent variable vector and the upper limit of the range of the possible value of the element as the value of the element of the artificial latent variable vector.

The term $L_{syn\text{-}encoder}^{(p)}$ is a term related to artificial data in which values of all elements of the input vector are the upper limit of the range of the possible value, or artificial data in which values of all elements of the input vector are the lower limit of the range of the possible value. For example, in the example of FIG. 1 in which each element of the input vector has a value of either 1 or 0, the term $L_{syn\text{-}encoder}^{(p)}$ is a term related to artificial data in which the input vector is a vector (1, . . . , 1) corresponding to all correct answers, or artificial data in which the input vector is a vector (0, . . . , 0) corresponding to all incorrect answers. Specifically, the term $L_{syn\text{-}encoder}^{(1)}$ is binary cross entropy between a latent variable vector that is an output of the encoder in a case where the input vector is the vector (1, . . . , 1) corresponding to all correct answers, and the vector (1, . . . , 1) in which all elements are 1 (that is, the upper limit of the range of the possible value) and that is a vector of ideal latent variables in the case where the input vector is the vector (1, . . . , 1) corresponding to all correct answers. In addition, the term $L_{syn\text{-}encoder}^{(2)}$ is binary cross entropy between a latent variable vector that is an output of the encoder in a case where the input vector is the vector (0, . . . , 0) corresponding to all incorrect answers, and a vector (0, . . . , 0) in which all elements are 0 (that is, the lower limit of the range of the possible value) and that is a vector of ideal latent variables in the case where the input vector is the vector (0, . . . , 0) corresponding to all incorrect answers. The term $L_{syn\text{-}encoder}^{(1)}$ is based on a requirement that it is desirable that all elements of the latent variable vector are 1 (that is, the upper limit of the range of the possible value) when the input vector is (1, . . . , 1), that is, when all elements of the input vector are 1 (that is, the upper limit of the range of the possible value), and the term $L_{syn\text{-}encoder}^{(2)}$ is based on a requirement that it is desirable that all elements of the latent variable vector are 0 (that is, the lower limit of the range of the possible value) when the input vector is (0, . . . , 0), that is, when all elements of the input vector are 0 (that is, the lower limit of the range of the possible value).

On the other hand, the term $L_{syn\text{-}decoder}^{(p)}$ is a term related to artificial data in which values of all elements of the output vector are the upper limit of the range of the possible value, or artificial data in which values of all elements of the output vector are the lower limit of the range of the possible value. For example, in the example of FIG. 1 in which each element of the input vector has a value of either 1 or 0, the term $L_{syn\text{-}decoder}^{(p)}$ is a term related to artificial data in which the output vector is the vector (1, . . . , 1 corresponding to all correct answers, or artificial data in which the output vector is the vector (0, . . . , 0 corresponding to all incorrect answers. Specifically, the term $L_{syn\text{-}decoder}^{(1)}$ is binary cross entropy between an output vector that is an output of the decoder in a case where the latent variable vector is the vector (1, . . . , 1 in which values of all elements are the upper limit of the range of the possible value, and the vector (1, . . . , 1 in which all elements are 1 (that is, equivalent to all correct answers) and that is an ideal output vector in a case where values of all elements of the latent variable vector are the upper limit of the range of the possible value. In addition, the term $L_{syn\text{-}decoder}^{(3)}$ is binary cross entropy between an output vector that is an output of the decoder in a case where the latent variable vector is the vector (0, . . . , 0 in which values of all elements are the lower limit of the range of the possible value, and the vector (0, . . . , 0 in which all elements are 0 (that is, equivalent to all incorrect answers) and that is an ideal output vector in a case where values of all elements of the latent variable vector is the lower limit of the range of the possible value. The term $L_{syn\text{-}decoder}^{(1)}$ is based on a requirement that it is desirable that all elements of the output vector are 1 (that is, the upper limit of the range of the possible value) when the latent variable vector is (1, . . . , 1), that is, when all elements of the latent variable vector are 1 (that is, the upper limit of the range of the possible value), and the term $L_{syn\text{-}decoder}^{(2)}$ is based on a requirement that it is desirable that all elements of the output vector are 0 (that is, the lower limit of the range of the possible value) when the latent variable vector is (0, . . . , 0), that is, when all elements of the latent variable vector are 0 (that is, the lower limit of the range of the possible value).

The loss function includes the term $L_{real}$ defined as described above is included, whereby the learning of the neural network is performed such that a feature is obtained in which, in a case where two input vectors are set as a first input vector and a second input vector, and a value of an element of the first input vector is greater than a value of an element of the second input vector for at least one element of the input vector, and a value of an element of the first input vector is greater than or equal to a value of an element of the second input vector for all remaining elements of the input vector, a latent variable vector obtained by converting the first input vector is set as a first latent variable vector, a latent variable vector obtained by converting the second input vector is set as a second latent variable vector, a value of an element of the first latent variable vector is greater than a value of an element of the second latent variable vector for at least one element of the latent variable vector, and a value of an element of the first latent variable vector is greater than or equal to a value of an element of the second latent variable vector for all remaining elements of the latent variable vector. In addition, the loss function L further includes $L_{syn\text{-}endcoder}^{(p)}$, and $L_{syn\text{-}decoder}^{(p)}$ in addition to the term $L_{real}$, that is, the term $L_{mono}$, whereby the learning of the neural network is performed such that the values of all elements of the latent variable vector are included in the range of [0, 1] (that is, the range of the possible value).

Next, a learning method of Constraint 2 will be described. In the description of the learning method of Constraint 2, a number of an input vector used for learning is set as s (s is an integer greater than or equal to 1 and less than or equal to S, and S is the number of pieces of training data), a number of an element of a latent variable vector is set as j (j is an integer greater than or equal to 1 and less than or equal to J), a number of an element of an input vector and an output vector is set as k (k is an integer greater than or equal to 1 and less than or equal to K, and K is an integer greater than J), an input vector is set as $X_s$, a latent variable vector obtained by converting the input vector $X_s$ is set as $Z_s$, an output vector obtained by converting the latent variable vector $Z_s$ is set as $P_s$, the k-th element of the input vector $X_s$ is set as $x_{sk}$, the k-th element of the output vector $P_s$ is set as $p_{sk}$, and the j-th element of the latent variable vector $Z_s$ is set as $z_{sj}$.

The encoder may be any encoder as long as the encoder converts the input vector $X_s$ into the latent variable vector $Z_s$, and may be, for example, an encoder of a general VAE. In addition, it is not necessary to make the loss function used for learning special, and a loss function conventionally used, for example, a sum of the term $L_{RC}$ and the term $L_{prior}$ described above as the terms used in general VAE learning may be used as the loss function.

The decoder converts the latent variable vector $Z_s$ into the output vector $P_s$, and learning is performed by constraining all weight parameters of the decoder to be non-negative values or constraining all weight parameters of the decoder to be non-positive values.

Using an example in which all weight parameters of a decoder configured by one layer are constrained to be non-negative values, a constraint of the decoder will be described. In a case where a vector in which the student's answer to a test problem whose number of problems is K is represented as 1 for the correct answer and as 0 for the incorrect answer is represented as input vectors $X_1$, $X_2$, . . . , and $X_S$, the input vector of the s-th student is $X_s=(x_{s1}, x_{s2}, \ldots, x_{sK})$, the latent variable vector obtained by converting the input vector $X_s$ by the encoder is $Z_s=(z_{s1}, z_{s2}, \ldots, z_{sJ})$, and the output vector obtained by converting the latent variable vector $Z_s$ by the decoder is $P_s=(p_{s1}, p_{s2}, \ldots, P_{sK})$. For the students to give a correct answer to each test problem, it is considered that abilities of various categories, for example, writing ability, illustration ability, and the like, are required with respective weights. To cause each element of the latent variable vector to correspond to each category of the ability, and to cause a value of a latent variable corresponding to the category to be larger as the magnitude of the ability of each category of the student is larger, a probability $p_{sk}$ at which the s-th student gives a correct answer to the k-th test problem may be expressed by Formula (5) with a weight $w_{jk}$ for the k-th test problem given to the j-th latent variable $z_{sj}$ as a non-negative value.

[Math. 5]

$$p_{sk} = \sigma(z_{s1}w_{1k} + z_{s2}w_{2k} + \ldots + z_{sJ}w_{Jk} + b_k) \tag{5}$$

Here, σ is a sigmoid function, and $b_k$ is a bias term for the k-th problem. The bias term $b_k$ is a term corresponding to a difficulty level that does not depend on the ability of each category described above for the k-th problem. That is, in the case of the decoder configured by one layer, if learning of a neural network including the encoder that converts the input vector $X_s$ for learning into the latent variable vector $Z_s$ and the decoder that converts the latent variable vector $Z_s$ into the output vector $P_s$ is performed such that the input vector $X_s$ for learning and the output vector $P_s$ are substantially identical to each other, constraining all weight parameters $w_{jk}$ (j=1, . . . , J, k=1, . . . , K) to be non-negative values, for all problems and all latent variables, it is possible to obtain an encoder that obtains a latent variable vector in which a certain latent variable is larger as the magnitude of the ability of a certain category is larger for the ability of each category, from the input vector that is a vector representing, for each student, answers for each test problem of the student as 1 for correct answers and as 0 for incorrect answers.

From the above, to cause a certain latent variable included in the latent variable vector to be larger as the magnitude of a certain property included in the input vector is larger, learning is performed by constraining all weight parameters of the decoder to be non-negative values. In addition, as can be seen from the above description, in a case where the certain latent variable included in the latent variable vector is made smaller as the magnitude of the certain property included in the input vector is larger, learning may be performed by constraining all weight parameters of the decoder to be non-positive values.

As described above, in the example of FIG. 1, each column represents the list of correctness/incorrectness of each student. The 60-dimensional list of correctness/incorrectness of the student is converted into 5-dimensional secondary data by using a learned encoder. Since the conversion by the learned encoder causes the latent variable to have monotonicity with respect to the input vector, the secondary data compressed in five dimensions reflects a feature of the list of correctness/incorrectness of the student. For example, if a latent variable vector is obtained by converting the list of correctness/incorrectness of the student of a test of Japanese or arithmetic, an element of secondary data that is the latent variable vector can be, for example, data corresponding to writing ability or data corresponding to illustration ability. Thus, it is possible to reduce a burden on an analyst by setting the secondary data as an analysis target instead of the list of the correctness/incorrectness of the student.

First Embodiment

A neural network learning device 100 performs learning of parameters of a neural network as a learning target by using training data. Here, the neural network as the learning target includes an encoder that converts an input vector into a latent variable vector and a decoder that converts the latent variable vector into an output vector. The latent variable vector is a lower-dimensional vector than the input vector and the output vector, and is a vector having a latent variable as an element. In addition, the parameters of the neural network include weight parameters and bias parameters of the encoder, and weight parameters and bias parameters of the decoder. The learning is performed such that the input vector and the output vector are substantially identical to each other. In addition, the learning is performed such that the latent variable has monotonicity with respect to the input vector.

Here, a description will be given assuming that a possible value of an element of the input vector and the output vector is a value of either 1 or 0, and a range of a possible value of the latent variable that is an element of the latent variable vector is [0, 1]. Note that a case where the possible value of the element of the input vector and the output vector is a value of either 1 or 0 is merely an example, and the range of the possible value of the element of the input vector and the output vector may be [0, 1], and further, the range of the possible value of the element of the input vector and the output vector may not be [0, 1]. That is, the range of the possible value of the element of the input vector and the range of the possible value of the element of the output vector can be set to [a, b], where a and b are any numbers that satisfy a<b.

Figure 2:
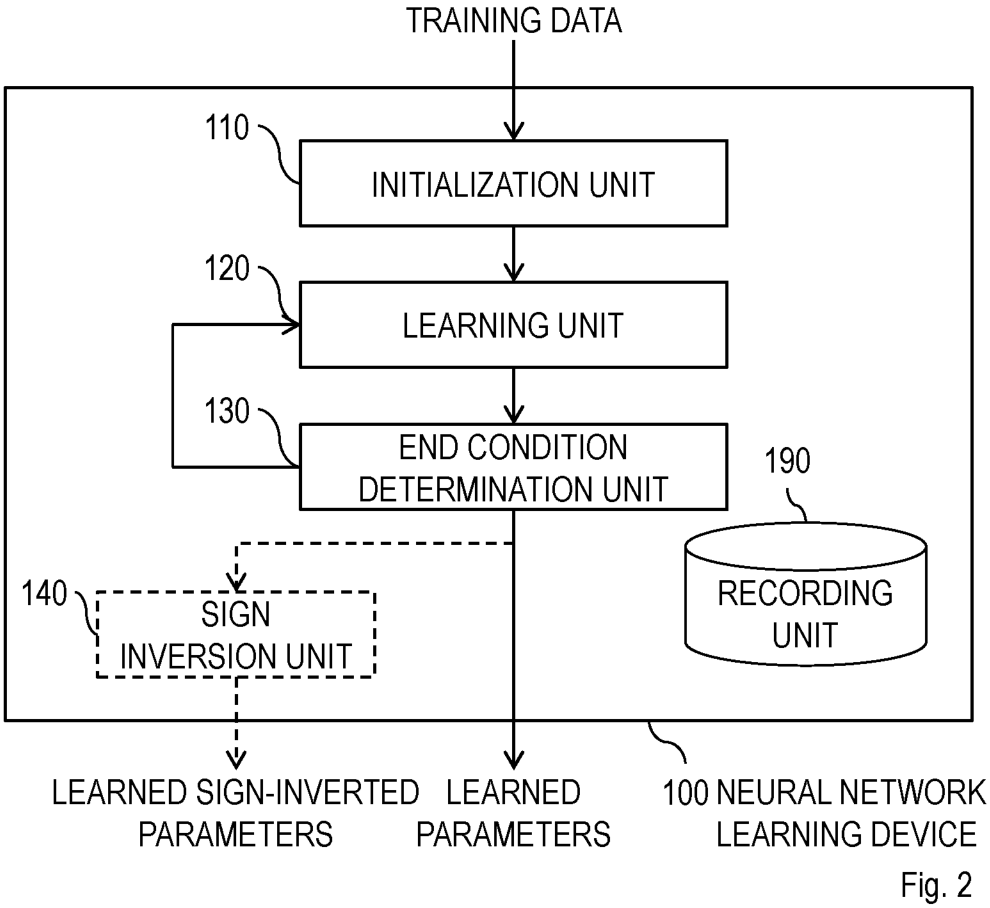
FIG. 2 is a block diagram illustrating a configuration of a neural network learning device 100.
Figure 3:
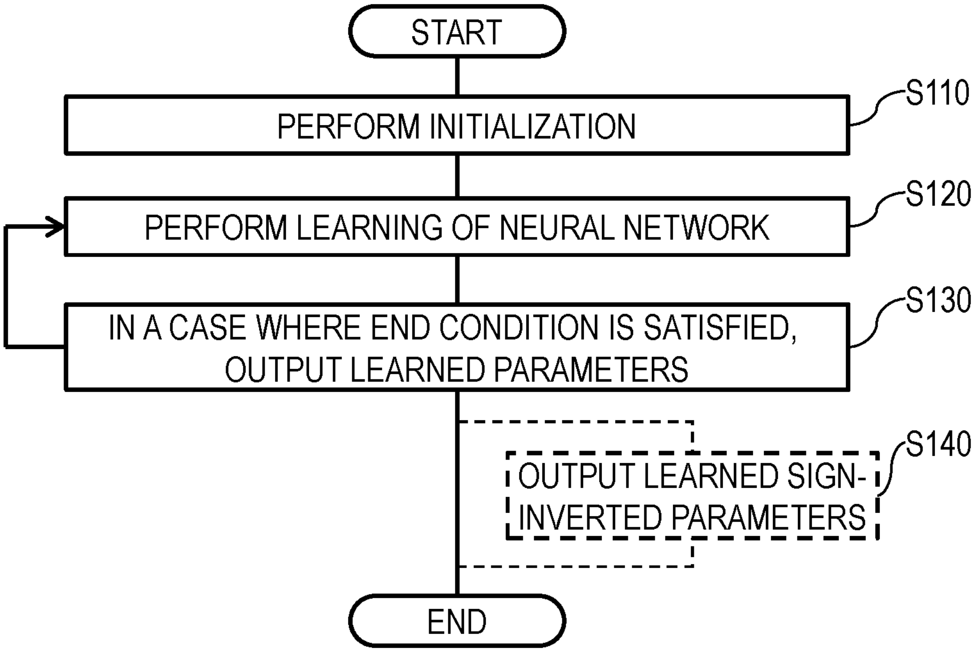
FIG. 3 is a flowchart illustrating operation of the neural network learning device 100.

Hereinafter, the neural network learning device 100 will be described with reference to FIGS. 2 to 3. FIG. 2 is a block diagram illustrating a configuration of the neural network learning device 100. FIG. 3 is a flowchart illustrating operation of the neural network learning device 100. As illustrated in FIG. 2, the neural network learning device 100 includes an initialization unit 110, a learning unit 120, an end condition determination unit 130, and a recording unit 190. The recording unit 190 is a component that appropriately records information necessary for processing performed by the neural network learning device 100. The recording unit 190 records, for example, initialization data used for initialization of the neural network. Here, the initialization data are initial values of the parameters of the neural network, and are, for example, initial values of the weight parameters and the bias parameters of the encoder, and initial values of the weight parameters and the bias parameters of the decoder.

The operation of the neural network learning device 100 will be described with reference to FIG. 3.

In S110, the initialization unit 110 performs initialization processing for the neural network by using the initialization data. Specifically, the initialization unit 110 sets an initial value for each parameter of the neural network.

In S120, the learning unit 120 inputs the training data, performs processing (hereinafter, referred to as parameter update processing) of updating each parameter of the neural network by using the training data, and outputs the parameters of the neural network together with information (for example, the number of times the parameter update processing has been performed) necessary for the end condition determination unit 130 to determine an end condition. The learning unit 120 performs learning of the neural network by, for example, a back propagation method by using a loss function. That is, in the parameter update processing of each of the times, the learning unit 120 performs processing of updating each parameter of the encoder and the decoder so that the loss function is small.

Here, the loss function includes a term for causing the latent variable to have monotonicity with respect to the input vector. In a case where the monotonicity is a relationship in which the latent variable monotonically increases with respect to the input vector, the loss function includes a term for causing the output vector to be larger as the latent variable is larger, for example, the term of the margin ranking error described in <Technical Background>. That is, the loss function includes, for example, at least one of a term having a larger value in a case where a vector in which a value of at least one element of the latent variable vector is replaced with a value smaller than the value is set as an artificial latent variable vector, and a value of a corresponding element of the output vector when the latent variable vector is input is smaller than a value of any element of the output vector when the artificial latent variable vector is input, or a term having a larger value in a case where a vector in which a value of at least one element of the latent variable vector is replaced with a value larger than the value is set as an artificial latent variable vector, and a value of a corresponding element of the output vector when the latent variable vector is input is larger than a value of any element of the output vector when the artificial latent variable vector is input. Further, in a case where an element of the input vector has a value of either 1 or 0, and a range of a possible element of the latent variable vector is [0, 1], the loss function may include at least one term of: binary cross entropy between the latent variable vector when the input vector is (1, . . . , 1) and the vector (1, . . . , 1 (where the dimension of the vector is equal to the dimension of the latent variable vector); binary cross entropy between the latent variable vector when the input vector is (0, . . . , 0) and the vector (0, . . . , 0 (where the dimension of the vector is equal to the dimension of the latent variable vector); binary cross entropy between the output vector when the latent variable vector is (1, . . . , 1) and the vector (1, . . . , 1 (where the dimension of the vector is equal to the dimension of the output vector); or binary cross entropy between the output vector when the latent variable vector is (0, . . . , 0) and the vector (0, . . . , 0 (where the dimension of the vector is equal to the dimension of the output vector).

On the other hand, in a case where the monotonicity is a relationship in which the latent variable monotonically decreases with respect to the input vector, the loss function includes a term for causing the output vector to be smaller as the latent variable is larger. That is, the loss function includes, for example, at least one of a term having a larger value in a case where a vector in which a value of at least one element of the latent variable vector is replaced with a value smaller than the value is set as an artificial latent variable vector, and a value of a corresponding element of the output vector when the latent variable vector is input is larger than a value of any element of the output vector when the artificial latent variable vector is input, or a term having a larger value in a case where a vector in which a value of at least one element of the latent variable vector is replaced with a value larger than the value is set as an artificial latent variable vector, and a value of a corresponding element of the output vector when the latent variable vector is input is smaller than a value of any element of the output vector when the artificial latent variable vector is input. Further, in a case where an element of the input vector has a value of either 1 or 0, and a range of a possible element of the latent variable vector is [0, 1], the loss function may include at least one term of: binary cross entropy between the latent variable vector when the input vector is (1, . . . , 1) and the vector (0, . . . , 0 (where the dimension of the vector is equal to the dimension of the latent variable vector); binary cross entropy between the latent variable vector when the input vector is (0, . . . , 0) and the vector (1, . . . , 1 (where the dimension of the vector is equal to the dimension of the latent variable vector); binary cross entropy between the value of the output vector when the latent variable vector is (1, . . . , 1) and the vector (0, . . . , 0 (where the dimension of the vector is equal to the dimension of the output vector.); or binary cross entropy between the value of the output vector when the latent variable vector is (0, . . . , 0) and the vector (1, . . . , 1 (where the dimension of the vector is equal to the dimension of the output vector).

In S130, the end condition determination unit 130 inputs the parameters of the neural network output in S120 and the information necessary for determining the end condition, and determines whether or not the end condition that is a condition regarding the end of learning is satisfied (for example, the number of times the parameter update processing has been performed has reached a predetermined number of times of repetition), and in a case where the end condition is satisfied, the parameters of the encoder obtained in S120 performed last is output as learned parameters and the processing is ended, and in a case where the end condition is not satisfied, the processing returns to the processing in S120.

Modification

Instead of setting the range of the possible value of the latent variable that is the element of the latent variable vector to [0, 1], [m, M] (where $m<M$) may be set, or as described above, the range of the possible value of the element of the input vector and the output vector may be set to [a, b]. Further, the range of possible value may be individually set for each element of the latent variable vector, or the range of possible value may be individually set for each element of the input vector and the output vector. In this case, the number of the element of the latent variable vector is set as j (j is an integer greater than or equal to 1 and less than or equal to J, and J is an integer greater than or equal to 2), the range of the possible value of the j-th element is set as $[m_j, M_j]$(where $m_j<M_j$), the number of the element of the input vector and the output vector is set as k (k is an integer greater than or equal to 1 and less than or equal to K, and K is an integer greater than J), and the range of the possible value of the k-th element is set as $[a_k, b_k]$(where $a_k<b_k$), the term included in the loss function may be as follows. In a case where monotonicity is a relationship in which the latent variable monotonically increases with respect to the input vector, the loss function includes at least one term of: cross entropy between the latent variable vector when the input vector is $(b_1, \ldots, b_K)$ and a vector $(M_1, \ldots, M_J)$; cross entropy between the latent variable vector when the input vector is $(a_1, \ldots, a_K)$ and a vector $(m_1, \ldots, m_J)$; cross entropy between the output vector when the latent variable vector is $(M_1, \ldots, M_J)$ and the vector $(b_1, \ldots, b_K)$; or cross entropy between the output vector when the latent variable vector is $(m_1, \ldots, m_J)$ and the vector $(a_1, \ldots, a_K)$.

On the other hand, in a case where monotonicity is a relationship in which the latent variable monotonically decreases with respect to the input vector, the loss function includes at least one term of: cross entropy between the latent variable vector when the input vector is $(b_1, \ldots, b_K)$ and a vector $(m_1, \ldots, m_J)$; cross entropy between the latent variable vector when the input vector is $(a_1, \ldots, a_K)$ and a vector $(M_1, \ldots, M_J)$; cross entropy between the output vector when the latent variable vector is $(M_1, \ldots, M_J)$ and the vector $(a_1, \ldots, a_K)$; or cross entropy between the output vector when the latent variable vector is $(m_1, \ldots, m_J)$ and the vector $(b_1, \ldots, b_K)$. Note that the cross entropy described above is an example of a value corresponding to the magnitude of a difference between vectors, and for example, a value that increases as the difference between vectors increases such as a mean squared error (MSE) can be used instead of the cross entropy described above.

In the above description, an example has been described in which the number of dimensions of the latent variable vector is greater than or equal to two, but the number of dimensions of the latent variable vector may be one. That is, J described above may be 1. In a case where the number of dimensions of the latent variable vector is one, it is sufficient that the above-described "latent variable vector" is read as a "latent variable" and "value of at least one element of the latent variable vector" is read as a "value of the latent variable", and there is no condition for "all remaining elements of the latent variable vector".

Finally, analysis work will be described. Data to be analyzed is converted into lower-dimensional secondary data by using an encoder (learned encoder) for which learned parameters are set. Here, the secondary data is a latent variable vector obtained by inputting the data to be analyzed to the learned encoder. Since the secondary data is lower-dimensional data than the data to be analyzed, it is easier to analyze the secondary data as a target than to directly analyze the data to be analyzed.

According to the first embodiment, it is possible to perform learning of a neural network including an encoder and a decoder such that a parameter of the encoder is obtained that causes a certain latent variable included in the latent variable vector to be larger or the certain latent variable included in the latent variable vector to be smaller as the magnitude of a certain property included in the input vector is larger. Then, the burden on the analyst can be reduced by setting, as the analysis target, the low-dimensional secondary data obtained by converting the high-dimensional data to be analyzed using the learned encoder.

Second Embodiment

In the first embodiment, a method has been described of performing learning of the encoder that outputs the latent variable vector in which a certain latent variable included in the latent variable vector is larger, or the latent variable vector in which a certain latent variable included in the latent variable vector is smaller, as the magnitude of a certain property included in the input vector is larger, by performing the learning by using the loss function including the term for causing the latent variable to have monotonicity with respect to the input vector. Here, a description will be given of a method of performing learning of the encoder that outputs the latent variable vector in which a certain latent variable included in the latent variable vector is larger, or the latent variable vector in which a certain latent variable included in the latent variable vector is smaller, as the magnitude of a certain property included in the input vector is larger, by performing the learning such that the weight parameter of the decoder satisfies a predetermined condition.

The neural network learning device 100 of the present embodiment is different from the neural network learning device 100 of the first embodiment only in the operation of the learning unit 120. Thus, only the operation of the learning unit 120 will be described below.

In S120, the learning unit 120 inputs the training data, performs processing (hereinafter, referred to as parameter update processing) of updating each parameter of the neural network by using the training data, and outputs the parameters of the neural network together with information (for example, the number of times the parameter update processing has been performed) necessary for the end condition determination unit 130 to determine an end condition. The learning unit 120 performs learning of the neural network by, for example, a back propagation method by using a loss function. That is, in the parameter update processing of each of the times, the learning unit 120 performs processing of updating each parameter of the encoder and the decoder so that the loss function is small.

The neural network learning device 100 of the present embodiment performs learning in such a manner that the weight parameter of the decoder satisfies a predetermined condition. In a case where the neural network learning device 100 performs learning such that the latent variable has a relationship of a monotonic increase with respect to the input vector, the neural network learning device 100 performs learning in such a manner that a condition that all weight parameters of the decoder are non-negative is satisfied. That is, in this case, in the parameter update processing of each of the times performed by the learning unit 120, each parameter of the encoder and the decoder is updated by constraining all weight parameters of the decoder to be non-negative values. More specifically, the decoder included in the neural network learning device 100 includes a layer that obtains a plurality of output values from a plurality of input values, each output value of the layer includes a term obtained by adding together the plurality of input values to which weight parameters are respectively given, and the parameter update processing of each of the times performed by the learning unit 120 is performed satisfying a condition that all weight parameters of the decoder are non-negative values. Note that the term obtained by adding together the plurality of input values to which weight parameters are respectively given can also be referred to as a term obtained by adding together all values obtained by multiplying each input value and the weight parameter corresponding to the input value together, a term obtained by weighted addition of the plurality of input values with weight parameters respectively corresponding to each of the plurality of input values as weights, or the like.

On the other hand, in a case where learning is performed such that the latent variable has a relationship of a monotonic decrease with respect to the input vector, the neural network learning device 100 performs learning in such a manner that a condition that all weight parameters of the decoder are non-positive is satisfied. That is, in this case, in the parameter update processing of each of the times performed by the learning unit 120, each parameter of the encoder and the decoder is updated by constraining all weight parameters of the decoder to be non-positive values. More specifically, the decoder included in the neural network learning device 100 includes a layer that obtains a plurality of output values from a plurality of input values, each output value of the layer includes a term obtained by adding together the plurality of input values to which weight parameters are respectively given, and the parameter update processing of each of the times performed by the learning unit 120 is performed satisfying a condition that all weight parameters of the decoder are non-positive values.

In a case where the neural network learning device 100 performs learning in such a manner that the condition that all weight parameters of the decoder are non-negative is satisfied, the initial values of the weight parameters of the decoder among the initialization data recorded by the recording unit 190 may be a non-negative value. Similarly, in a case where the neural network learning device 100 performs learning in such a manner that the condition that all weight parameters of the decoder are non-positive is satisfied, the initial values of the weight parameters of the decoder among the initialization data recorded by the recording unit 190 may be a non-positive value.

Note that, also in the second embodiment, similarly to the first embodiment, the number of dimensions of the latent variable vector may be one. In a case where the number of dimensions of the latent variable vector is one, it is sufficient that the above-described "latent variable vector" is read as a "latent variable".

Modification

Although the description has been given assuming that the learning satisfying the condition that all weight parameters of the decoder are non-negative is learning in which the latent variable has a relationship of a monotonic increase with respect to the input vector, it is possible to obtain an encoder in which the latent variable has a relationship of a monotonic decrease with respect to the input vector if an encoder is used including parameters obtained by inverting signs of all parameters (that is, all learned parameters) of the encoder obtained by the learning. Similarly, although the description has been given assuming that the learning satisfying the condition that all weight parameters of the decoder are non-positive is learning in which the latent variable has a relationship of a monotonic decrease with respect to the input vector, it is possible to obtain an encoder in which the latent variable has a relationship of a monotonic increase with respect to the input vector if an encoder is used including parameters obtained by inverting signs of all parameters (that is, all learned parameters) of the encoder obtained by the learning.

That is, the neural network learning device 100 may further include a sign inversion unit 140 as indicated by a broken line in FIG. 2, and may also perform S140 indicated by a broken line in FIG. 3. In S140, the sign inversion unit 140 may obtain and output, as learned sign-inverted parameters, a value obtained by inverting a sign of each learned parameter output in S130, that is, a value obtained, for each learned parameter, by setting the absolute value as it is, setting a positive value as a negative value, and setting a negative value as a positive value. More specifically, in a case where the encoder included in the neural network learning device 100 includes one or more layers that obtain a plurality of output values from a plurality of input values, and each output value of each layer includes a term obtained by adding together the plurality of input values to which weight parameters are respectively given, it is only required to further include the sign inversion unit 140 that outputs sign-inverted weight parameters obtained by inverting a sign of each weight parameter (that is, each learned parameter output by the end condition determination unit 130) of the encoder obtained by the learning.

In the analysis work, the data to be analyzed is converted into lower-dimensional secondary data by using the encoder for which the learned sign-inverted parameters are set.

According to the second embodiment, it is possible to perform learning of a neural network including an encoder and a decoder such that a parameter of the encoder is obtained that causes a certain latent variable included in the latent variable vector to be larger or the certain latent variable included in the latent variable vector to be smaller as the magnitude of a certain property included in the input vector is larger. Then, the burden on the analyst can be reduced by setting, as the analysis target, the low-dimensional secondary data obtained by converting the high-dimensional data to be analyzed using the learned encoder.

Third Embodiment

In the above-described example of analyzing test results of students for test problems, in a case where the test results of the students for all the test problems (information on whether it is a correct answer or an incorrect answer) have been obtained, the value of the latent variable obtained by converting the list of correct/incorrect of the students for the test can be a value corresponding to the magnitude of the ability of each student for each category of the ability if the learned encoder of the first embodiment or the second embodiment is used. However, for example, in a case where the test results of the students for some of the test problems have not been obtained, such as a case where the tests for Japanese and arithmetic have been taken but the tests for science and social studies have not been taken, a corresponding latent variable can be obtained from the value corresponding to the magnitude of the ability of each student for each category of the ability can be obtained by further devising. The neural network learning device 100 including this device will be described as a third embodiment.

First, a technical background of the neural network learning device 100 of the present embodiment will be described using an example of analyzing test results of students for test problems. A neural network and learning thereof of the present embodiment have the following features a to c.

[Feature a] a Test Result of Each Problem is Represented by a Correct Answer Bit and an Incorrect Answer Bit.

In the neural network of the present embodiment, an answer to a test problem not taken by each student is treated as no answer, and an input vector is set as a vector in which an answer to each problem is represented by using a correct answer bit with 1 for a correct answer and 0 for no answer and an incorrect answer, and an incorrect answer bit with 1 for an incorrect answer and 0 for no answer and correct answer. For example, assuming that the correct answer bit for the k-th test problem of the s-th student is $x^{(1)}_{sk}$ and the incorrect answer bit is $x^{(0)}_{sk}$ the input vector of the s-th student for the test problem whose number of problems is K is a vector including a correct answer bit group $\{x^{(1)}_{s1}, x^{(1)}_{s2}, \ldots, x^{(1)}_{sk}\}$ and an incorrect answer bit group $\{x^{(0)}_{s1}, x^{(0)}_{s2}, \ldots, x^{(0)}_{sk}\}$.

[Feature b]

The Encoder Includes, at the Beginning of the Encoder, a Layer for Obtaining, from a Correct Answer Bit Group and an Incorrect Answer Bit Group, Intermediate Information in which Giving No Answer does not Affect an Output of the Encoder.

In the neural network of the present embodiment, the first layer of the encoder (the layer having the input vector as the input) obtains intermediate information $q_{sh}$ of an intermediate information group $\{q_{s1}, q_{s2}, \ldots, q_{sH}\}$ of the s-th student by Formula (6).

[Math. 6]

$$q_{sh} = \sum_{k=1}^{K} w_{hk}^{(1)} x_{sk}^{(1)} + \sum_{k=1}^{K} w_{hk}^{(0)} x_{ck}^{(0)} + b_h \quad (6)$$

Symbols $w^{(1)}_{hk}$ and $w^{(0)}_{hd}$ are weights, and a symbol $b_h$ is a bias term for the h-th intermediate information. In a case where the s-th student gives a correct answer to the k-th test problem, since $x^{(1)}_{s1}$ is 1 and $x^{(0)}_{s1}$ is 0, only $w^{(1)}_{hk}$ out of the two weights of Formula (6) reacts, and $w^{(0)}_{hk}$ has no reaction. In a case where the s-th student gives an incorrect answer to the k-th test problem, since $x^{(1)}_{sk}$ is 0 and $x^{(0)}_{sk}$ is 1, only $w^{(0)}_{hk}$ out of the two weights of Formula (6) reacts, and $w^{(1)}_{hk}$ has no reaction. In a case where the s-th student gives no answer to the k-th test problem (that is, in a case where the s-th student has not taken the k-th test problem), since both $x^{(1)}_{sk}$ and $x^{(0)}_{sk}$ are 0, both the two weights $w^{(1)}_{hk}$ and $w^{(0)}_{hk}$ of Formula (6) have no reaction. Note that reacting means that learning of the weight is performed at the time of learning of the encoder and the weight affects at the time of using the learned encoder, and no reaction means that learning of the weight is not performed at the time of learning of the encoder and the weight does not affect at the time of using the learned encoder. Thus, by using Formula (6), it is possible to obtain intermediate information in which correct and incorrect answers affect the output of the encoder and no answer does not affect the output of the encoder. Any layer may be used for a layer subsequent to the first layer of the encoder as long as the intermediate information group $\{q_{s1}, q_{s2}, \ldots, q_{sH}\}$ is converted into the latent variable vector $Z_s=(z_{s1}, z_{s2}, \ldots, z_{sJ})$.

[Feature c] a Loss Function is Used in which Giving No Answer is not Regarded as a Loss.

In the learning of the present embodiment, assuming that the decoder obtains, as an output vector, the vector $P_s=(P_{s1}, p_{s2}, \ldots, p_{sK})$ based on a probability that the s-th student gives a correct answer to each test problem from the latent variable vector $Z_s=(z_{s1}, z_{s2}, \ldots, z_{sJ})$, and assuming that a loss $L_{sk}$ for the k-th problem of the s-th student is $-\log(p_{sk})$ in a case where $x^{(1)}_{sk}$ is 1 (that is, in the case of a correct answer), $-\log(1-p_{sk})$ in a case where $x^{(0)\,sk}$ is 1 (that is, in the case of an incorrect answer), and 0 in a case where both $x^{(1)}_{sk}$ and $x^{(1)}_{sk}$ are 0 (that is, in the case of no answer), a loss function is used including a sum of losses $L_{sk}$ for all the test problems k=1, . . . , and K of the training data s=1, . . . , and S (Formula (7) below) as the above-described term $L_{RC}$.

[Math. 7]

$$L_{RC} = \sum_{k=1}^{K} \sum_{s=1}^{S} L_{sk} \quad (7)$$

The above-described $-\log(p_{sk})$ has a larger value as the probability $p_{sk}$ that the s-th student gives a correct answer to the k-th problem obtained by the decoder is smaller (that is, as the probability is farther away from 1) although the s-th student has actually given a correct answer to the k-th problem. The above-described $-\log(1-p_{sk})$ has a larger value as the probability $(1-p_{sk})$ that the s-th student gives an incorrect answer to the k-th problem obtained by the decoder is smaller (that is, as the probability is farther away from 1) although the s-th student has actually given an incorrect answer to the k-th problem.

Next, a difference of the neural network learning device 100 of the present embodiment from the neural network learning devices 100 of the first and second embodiments will be described.

As described above as Feature a, the input vector of the encoder is a vector in which an answer to a test problem not taken by each student is treated as no answer and an answer to each problem is represented by using a correct answer bit with 1 for a correct answer and 0 for no answer and an incorrect answer, and an incorrect answer bit with 1 for an incorrect answer and 0 for no answer and correct answer. That is, the training data is data in which an answer to a test problem not taken by each student is treated as no answer, for answers to K test problems for the s-th student, and an answer to each problem is represented by using a correct answer bit with 1 for a correct answer and 0 for no answer and an incorrect answer, and an incorrect answer bit with 1 for an incorrect answer and 0 for no answer and correct answer. In other words, the training data is data in which answers to K test problems for each student i for learning is represented by using a correct answer bit and an incorrect answer bit for each problem, and represented with 1 for the correct answer bit and 0 for the incorrect answer bit if the answer is a correct answer, with 0 for the correct answer bit and 1 for the incorrect answer bit if the answer is an incorrect answer, and with 0 for both the correct answer bit and the incorrect answer bit if the answer is no answer.

The first layer of the encoder (the layer having the input vector as the input) obtains a plurality of pieces of intermediate information from the input vector for the s-th student as described above as Feature b, and each piece of the intermediate information is obtained by adding together all of values of the correct answer bits to which weight parameters are respectively given and values of the incorrect answer bits to which weight parameters are respectively given.

In the parameter update processing performed by the learning unit 120 of the neural network learning device 100 of the present embodiment, as described above as Feature c, processing of updating each parameter of the encoder and the decoder is performed such that the loss function including a sum of losses for all pieces of training data and all test problems is small, in which each of the losses is a larger value as the probability $p_{sk}$ that the s-th student gives a correct answer to the k-th problem obtained by the decoder is smaller in a case where the s-th student gives a correct answer to the k-th problem, a larger value as the probability $p_{sk}$ that the s-th student gives an incorrect answer to the k-th problem obtained by the decoder is smaller in a case where the s-th student gives an incorrect answer to the k-th problem, and 0 in a case where the s-th student gives no answer to the k-th problem.

Note that the present embodiment is not limited to the above-described example of a case where test results of students for test problems are analyzed, and can also be applied to a case where information acquired by a plurality of sensors is analyzed. For example, a sensor that detects the presence or absence of a predetermined situation can acquire two types of information: information indicating that the predetermined situation has been detected, and information indicating that the predetermined situation has not been detected. However, in a case where information acquired by a plurality of sensors via a communication network is collected and analyzed, there is a possibility that, due to loss of a communication packet or the like, information indicating that the predetermined situation has been detected or information indicating that the predetermined situation has not been detected is not obtained for any of the sensors, and there is no information. That is, information that can be used for analysis may be any one of three types of information, that is, information indicating that the predetermined situation has been detected, information indicating that the predetermined situation has not been detected, and none of the pieces of information exists, for each sensor. The present embodiment can also be used in such a case.

That is, in a description without specializing in usage form, the neural network learning device 100 of the present embodiment is a neural network learning device that performs learning of a neural network including an encoder that converts an input vector into a latent variable vector having a latent variable as an element and a decoder that converts the latent variable vector into an output vector such that the input vector and the output vector are substantially identical to each other, the neural network learning device including a learning unit 120 that performs learning by repeating parameter update processing of updating parameters included in the neural network, in which the encoder, when each of pieces of input information included in a predetermined input information group corresponds to one of three ways of positive information, negative information, and no information, inputs an input vector that represents each of the pieces of input information by a positive information bit that is 1 in a case where the input information corresponds to positive information, and is 0 in a case where there is no information or in a case where the input information corresponds to negative information, and a negative information bit that is 1 in a case where the input information corresponds to negative information, and is 0 in a case where there is no information or in a case where the input information corresponds to positive information, the encoder includes a plurality of layers, a layer having the input vector as an input obtains a plurality of output values from the input vector, each of the output values is obtained by adding together all of values of positive information bits included in the input vector to which weight parameters are respectively given and values of negative information bits included in the input vector to which weight parameters are respectively given, and the parameter update processing is performed such that a value of a loss function is smaller, the loss function including a sum for all pieces of input information of an input information group for learning of loss that has, in a case where the input information corresponds to positive information, a larger value as a probability that input information obtained by the decoder (that is, input information restored by the decoder) corresponds to positive information is smaller, and in a case where the input information corresponds to negative information, a larger value as a probability that input information obtained by the decoder corresponds to negative information is smaller, and in a case where the input information does not exist, a value of substantially zero.

Note that, in the example of the case where test results of students for test problems are analyzed, the fact that the answer is a correct answer corresponds to the fact that the input information "corresponds to positive information", the fact that the answer is an incorrect answer corresponds to the fact that the input information "corresponds to negative information", and the fact that the answer is no answer corresponds to the fact that "there is no information". In addition, in the example of the case where information acquired by sensors is analyzed, the information indicating that the predetermined situation has been detected corresponds to the fact that the input information "corresponds to positive information", the information indicating that the predetermined situation has not been detected corresponds to the fact that the input information "corresponds to negative information", and the fact that none of the pieces of information exists corresponds to the fact that "there is no information".

In the analysis work, in the example of the case where test results of students for test problems are analyzed, as described above as Feature a, for the student to be analyzed, the answer to the test problem not taken by the student is treated as no answer, and a vector in which the answer to each problem is represented by using a correct answer bit with 1 for the correct answer and 0 for no answer and an incorrect answer bit with 1 for the incorrect answer and 0 for no answer is set as the input vector of the encoder, and conversion into the low-dimensional secondary data is performed by using the encoder for which the learned parameters are set.

SUPPLEMENT

Figure 4:
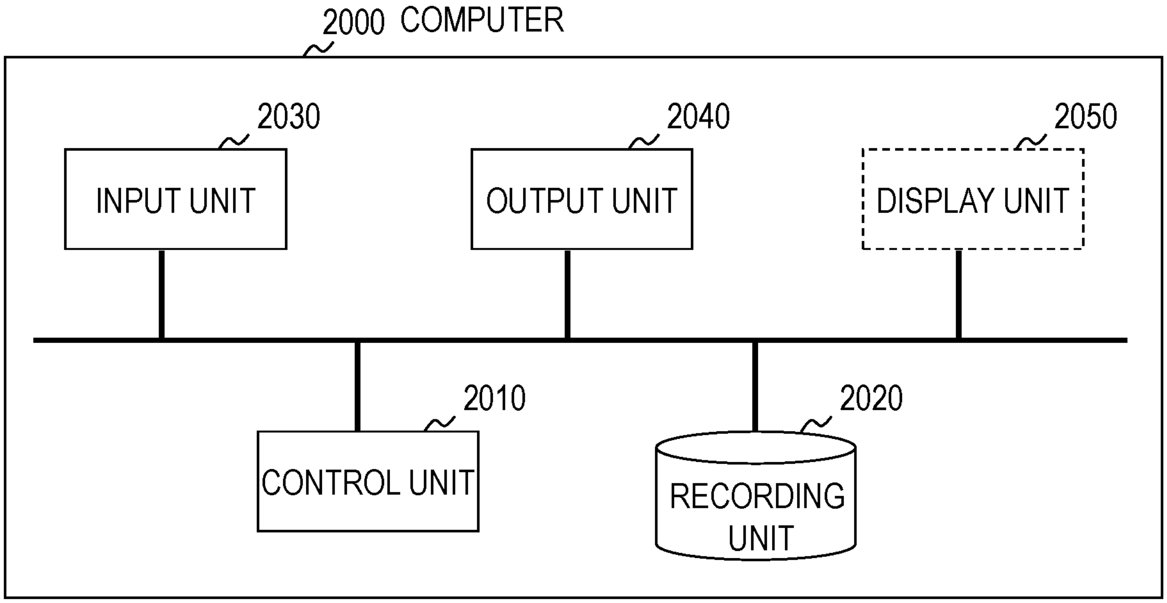
FIG. 4 is a diagram illustrating an example of a functional configuration of a computer that implements devices in embodiments of the present invention.

FIG. 4 is a diagram illustrating an example of a functional configuration of a computer that implements each device (that is, each node) described above. Processing in each device described above can be performed by causing a recording unit 2020 to read a program for causing a computer to function as each device described above and causing a control unit 2010, an input unit 2030, an output unit 2040, and the like to operate.

The device of the present invention includes, for example, an input unit to which a keyboard or the like can be connected as a single hardware entity, an output unit to which a liquid crystal display or the like can be connected, a communication unit to which a communication device (e.g., a communication cable) capable of communicating with the outside of the hardware entity can be connected, a CPU (Central Processing Unit, in which a cache memory, a register, or the like may be included), a RAM or a ROM as a memory, an external storage device as a hard disk, and a bus that connects the input unit, the output unit, the communication unit, the CPU, the RAM, the ROM, and the external storage device to each other so that data can be exchanged therebetween. In addition, a device (drive) or the like that can read and write data from and to a recording medium such as a CD-ROM may be provided in the hardware entity as necessary. Examples of a physical entity including such a hardware resource include a general-purpose computer.

The external storage device of the hardware entity stores a program that is required for implementing the above-described functions, data that is required for processing of the program, and the like (the program may be stored, for example, in a ROM as a read-only storage device instead of the external storage device). In addition, data or the like obtained by processing of the program is appropriately stored in a RAM, an external storage device, or the like.

In the hardware entity, each program stored in the external storage device (or ROM etc.) and data required for processing of each program are read into a memory as necessary, and are appropriately interpreted and processed by the CPU. As a result, the CPU implements a predetermined function (each component represented as . . . unit, . . . means, etc.).

The present invention is not limited to the above-described embodiments, and can be appropriately modified without departing from the gist of the present invention. In addition, the processing described in the above embodiments may be executed not only in time-series according to the described order, but also in parallel or individually according to the processing capability of the device that executes the processing or as necessary.

As described above, in a case where the processing function of the hardware entity (the device of the present invention) described in the above embodiments is implemented by a computer, processing content of the function of the hardware entity is described by a program. Then, the computer executes the program, and thus the processing function of the hardware entity is implemented on the computer.

The program describing the processing content may be recorded on a non-transitory computer-readable recording medium. The computer-readable recording medium may be, for example, any recording medium such as a magnetic recording device, an optical disk, a magneto-optical recording medium, or a semiconductor memory. Specifically, for example, a hard disk device, a flexible disk, a magnetic tape, or the like can be used as the magnetic recording device, a DVD (Digital Versatile Disc), a DVD-RAM (Random Access Memory), a CD-ROM (Compact Disc Read Only Memory), a CD-R(Recordable)/RW(ReWritable)/, or the like can be used as the optical disk, an MO (Magneto-Optical disc) or the like can be used as the magneto-optical recording medium, an EEP-ROM (Electronically Erasable and Programmable-Read Only Memory) or the like can be used as the semiconductor memory.

In addition, distribution of the program is performed by, for example, selling, transferring, or renting a portable recording medium such as a DVD or a CD-ROM on which the program is recorded. Further, a configuration may also be employed in which the program is stored in a storage device in a server computer and the program is distributed by transferring the program from the server computer to other computers via a network.

For example, the computer that executes such a program first temporarily stores the program recorded in the portable recording medium or the program transferred from the server computer in a storage device of the computer. Then, the computer reads the program stored in the storage device of itself and executes processing in accordance with the read program at the time of execution of the processing. In addition, in other execution modes of the program, the computer may read the program directly from the portable recording medium and executes the processing in accordance with the program, or alternatively, the computer may sequentially execute the processing in accordance with the received program every time the program is transferred from the server computer to the computer. Alternatively, the above processing may be executed by a so-called ASP (application service provider) service that implements a processing function only by issuing an instruction to execute the program and acquiring the result, without transferring the program from the server computer to the computer. Note that the program in the present embodiment includes information used for processing by an electronic computer and equivalent to the program (data or the like that is not a direct command to the computer but has a property that defines processing performed by the computer).

In addition, although the hardware entity is configured by executing a predetermined program on a computer in the embodiment, at least a part of the processing content may be implemented by hardware.

The description of the embodiments of the above-described present invention has been presented for purposes of illustration and description. There is no intention to be comprehensive or to limit the invention to the disclosed precise form. Modifications and variations can be made from the foregoing instructions. The embodiments have been selected and represented in order to provide the best illustration of the principles of the present invention and to enable those skilled in the art to utilize the present invention in various embodiments and with various modifications in order to be appropriate for considered practical use. All such modifications and variations are within the scope of the present invention as defined by the appended claims, interpreted in accordance with a fairly and legally equitable breadth.

The invention claimed is:

1. A neural network learning device that performs learning of a neural network including an encoder that converts an input vector into a latent variable vector having a latent variable as an element and a decoder that converts the latent variable vector into an output vector such that the input vector and the output vector are substantially identical to each other, wherein the learning is performed such that, in a case where two input vectors are set as a first input vector and a second input vector, and a value of an element of the first input vector is greater than a value of an element of the second input vector for at least one element of the input vector, and a value of an element of the first input vector is greater than or equal to a value of an element of the second input vector for all remaining elements of the input vector, a latent variable vector obtained by converting the first input vector is set as a first latent variable vector, a latent variable vector obtained by converting the second input vector is set as a second latent variable vector, a value of an element of the first latent variable vector is greater than a value of an element of the second latent variable vector for at least one element of the latent variable vector, and a value of an element of the first latent variable vector is greater than or equal to a value of an element of the second latent variable vector for all remaining elements of the latent variable vector.

2. A neural network learning device that performs learning of a neural network including an encoder that converts an input vector into a latent variable vector having a latent variable as an element and a decoder that converts the latent variable vector into an output vector such that the input vector and the output vector are substantially identical to each other, the neural network learning device comprising a learning circuitry configured to perform learning by repeating processing of updating parameters of the neural network to cause a value of a loss function to be small, wherein the loss function includes at least one of a term having a larger value in a case where a value of a corresponding element of an output vector when the latent variable vector is input is smaller than a value of any element of an output vector when a first artificial latent variable vector is input, the first artificial latent variable vector being a vector in which a value of at least one element of the latent variable vector is replaced with a value smaller than the value, or a term having a larger value in a case where a value of a corresponding element of an output vector when the latent variable vector is input is larger than a value of any element of an output vector when a second artificial latent variable vector is input, the second artificial latent variable vector being a vector in which a value of at least one element of the latent variable vector is replaced with a value larger than the value.

3. The neural network learning device according to claim 2, wherein a number of an element of the latent variable vector is set as j, and a range of a possible value of a j-th element of the latent variable vector is set as $[m_j, M_j]$, where j is an integer greater than or equal to 1 and less than or equal to J, and $m_j<M_j$, a number of an element of the input vector and the output vector is set as k, and a range of a possible value of a k-th element of the input vector and the output vector is set as $[a_k, b_k]$, where k is an integer greater than or equal to 1 and less than or equal to K, K is an integer greater than J, and $a_k<b_k$, and the loss function further includes at least one term of a value corresponding to a magnitude of a difference between the latent variable vector when the input vector is $(b_1, \ldots, b_k)$ and a vector $(M_1, \ldots, M_J)$, a value corresponding to a magnitude of a difference between the latent variable vector when the input vector is $(a_1, \ldots, a_K)$ and a vector $(m_1, \ldots, m_J)$, a value corresponding to a magnitude of a difference between the output vector when the latent variable vector is $(M_1, \ldots, M_J)$ and the vector $(b_1, \ldots, b_K)$, or a value corresponding to a magnitude of a difference between the output vector when the latent variable vector is $(m_1, \ldots, m_J)$ and the vector $(a_1, \ldots, a_K)$.

4. A neural network learning device that performs learning of a neural network including an encoder that converts an input vector into a latent variable vector having a latent variable as an element and a decoder that converts the latent variable vector into an output vector such that the input vector and the output vector are substantially identical to each other, wherein the learning is performed such that, in a case where two input vectors are set as a first input vector and a second input vector, and a value of an element of the first input vector is greater than a value of an element of the second input vector for at least one element of the input vector, and a value of an element of the first input vector is greater than or equal to a value of an element of the second input vector for all remaining elements of the input vector, a latent variable vector obtained by converting the first input vector is set as a first latent variable vector, a latent variable vector obtained by converting the second input vector is set as a second latent variable vector, a value of an element of the first latent variable vector is less than a value of an element of the second latent variable vector for at least one element of the latent variable vector, and a value of an element of the first latent variable vector is less than or equal to a value of an element of the second latent variable vector for all remaining elements of the latent variable vector.

5. A neural network learning device that performs learning of a neural network including an encoder that converts an input vector into a latent variable vector having a latent variable as an element and a decoder that converts the latent variable vector into an output vector such that the input vector and the output vector are substantially identical to each other, the neural network learning device comprising a learning circuitry configured to perform learning by repeating processing of updating parameters of the neural network to cause a value of a loss function to be small, wherein the loss function includes at least one of a term having a larger value in a case where a value of a corresponding element of an output vector when the latent variable vector is input is larger than a value of any element of an output vector when a first artificial latent variable vector is input, the first artificial latent variable vector being a vector in which a value of at least one element of the latent variable vector is replaced with a value smaller than the value, or a term having a larger value in a case where a value of a corresponding element of an output vector when the latent variable vector is input is smaller than a value of any element of an output vector when a second artificial latent variable vector is input, the second artificial latent variable vector being a vector in which a value of at least one element of the latent variable vector is replaced with a value larger than the value.

6. The neural network learning device according to claim 5, wherein a number of an element of the latent variable vector is set as j, and a range of a possible value of a j-th element of the latent variable vector is set as $[m_j, M_J]$, where j is an integer greater than or equal to 1 and less than or equal to J, and $m_j<M_J$, a number of an element of the input vector and the output vector is set as k, and a range of a possible value of a k-th element of the input vector and the output vector is set as $[a_k, b_k]$, where k is an integer greater than or equal to 1 and less than or equal to K, K is an integer greater than J, and $a_k<b_k$, and the loss function further includes at least one term of a value corresponding to a magnitude of a difference between the latent variable vector when the input vector is $(b_1, \ldots, b_K)$ and a vector $(m_1, \ldots, m_J)$, a value corresponding to a magnitude of a difference between the latent variable vector when the input vector is $(a_1, \ldots, a_K)$ and a vector $(M_1, \ldots, M_J)$, a value corresponding to a magnitude of a difference between the output vector when the latent variable vector is $(M_1, \ldots, M_J)$ and the vector $(a_1, \ldots, a_K)$, or a value corresponding to a magnitude of a difference between the output vector when the latent variable vector is $(m_1, \ldots, m_J)$ and the vector $(b_1, \ldots, b_K)$.

7. A neural network learning method in which a neural network learning device performs learning of a neural network including an encoder that converts an input vector into a latent variable vector having a latent variable as an element and a decoder that converts the latent variable vector into an output vector such that the input vector and the output vector are substantially identical to each other, wherein the learning is performed such that, in a case where two input vectors are set as a first input vector and a second input vector, and a value of an element of the first input vector is greater than a value of an element of the second input vector for at least one element of the input vector, and a value of an element of the first input vector is greater than or equal to a value of an element of the second input vector for all remaining elements of the input vector, a latent variable vector obtained by converting the first input vector is set as a first latent variable vector, a latent variable vector obtained by converting the second input vector is set as a second latent variable vector, a value of an element of the first latent variable vector is greater than a value of an element of the second latent variable vector for at least one element of the latent variable vector, and a value of an element of the first latent variable vector is greater than or equal to a value of an element of the second latent variable vector for all remaining elements of the latent variable vector.

8. A neural network learning method in which a neural network learning device performs learning of a neural network including an encoder that converts an input vector into a latent variable vector having a latent variable as an element and a decoder that converts the latent variable vector into an output vector such that the input vector and the output vector are substantially identical to each other, the neural network learning method comprising a learning step in which the neural network learning device performs learning by repeating processing of updating parameters of the neural network to cause a value of a loss function to be small, wherein the loss function includes at least one of a term having a larger value in a case where a value of a corresponding element of an output vector when the latent variable vector is input is smaller than a value of any element of an output vector when a first artificial latent variable vector is input, the first artificial latent variable vector being a vector in which a value of at least one element of the latent variable vector is replaced with a value smaller than the value, or a term having a larger value in a case where a value of a corresponding element of an output vector when the latent variable vector is input is larger than a value of any element of an output vector when a second artificial latent variable vector is input, the second artificial latent variable vector being a vector in which a value of at least one element of the latent variable vector is replaced with a value larger than the value.

9. A neural network learning method in which a neural network learning device performs learning of a neural network including an encoder that converts an input vector into a latent variable vector having a latent variable as an element and a decoder that converts the latent variable vector into an output vector such that the input vector and the output vector are substantially identical to each other, wherein the learning is performed such that, in a case where two input vectors are set as a first input vector and a second input vector, and a value of an element of the first input vector is greater than a value of an element of the second input vector for at least one element of the input vector, and a value of an element of the first input vector is greater than or equal to a value of an element of the second input vector for all remaining elements of the input vector, a latent variable vector obtained by converting the first input vector is set as a first latent variable vector, a latent variable vector obtained by converting the second input vector is set as a second latent variable vector, a value of an element of the first latent variable vector is less than a value of an element of the second latent variable vector for at least one element of the latent variable vector, and a value of an element of the first latent variable vector is less than or equal to a value of an element of the second latent variable vector for all remaining elements of the latent variable vector.

10. A neural network learning method in which a neural network learning device performs learning of a neural network including an encoder that converts an input vector into a latent variable vector having a latent variable as an element and a decoder that converts the latent variable vector into an output vector such that the input vector and the output vector are substantially identical to each other, the neural network learning method comprising a learning step in which the neural network learning device performs learning by repeating processing of updating parameters of the neural network to cause a value of a loss function to be small, wherein the loss function includes at least one of a term having a larger value in a case where a value of a corresponding element of an output vector when the latent variable vector is input is larger than a value of any element of an output vector when a first artificial latent variable vector is input, the first artificial latent variable vector being a vector in which a value of at least one element of the latent variable vector is replaced with a value smaller than the value, or a term having a larger value in a case where a value of a corresponding element of an output vector when the latent variable vector is input is smaller than a value of any element of an output vector when a second artificial latent variable vector is input, the second artificial latent variable vector being a vector in which a value of at least one element of the latent variable vector is replaced with a value larger than the value.

11. A non-transitory recording medium recording a program for causing a computer to function as the neural network learning device according to claim 1.

12. A non-transitory recording medium recording a program for causing a computer to function as the neural network learning device according to claim 2.

13. A non-transitory recording medium recording a program for causing a computer to function as the neural network learning device according to claim 4.

14. A non-transitory recording medium recording a program for causing a computer to function as the neural network learning device according to claim 5.

* * * * *